Feb. 1, 1966     H. E. JACKSON ETAL     3,233,024
FLEXIBLE TUBES AND THE MANUFACTURE THEREOF

Filed Aug. 31, 1960     2 Sheets-Sheet 1

INVENTOR
Harold Ernest Jackson
and Trevor Frederick Moss
BY
ATTORNEY

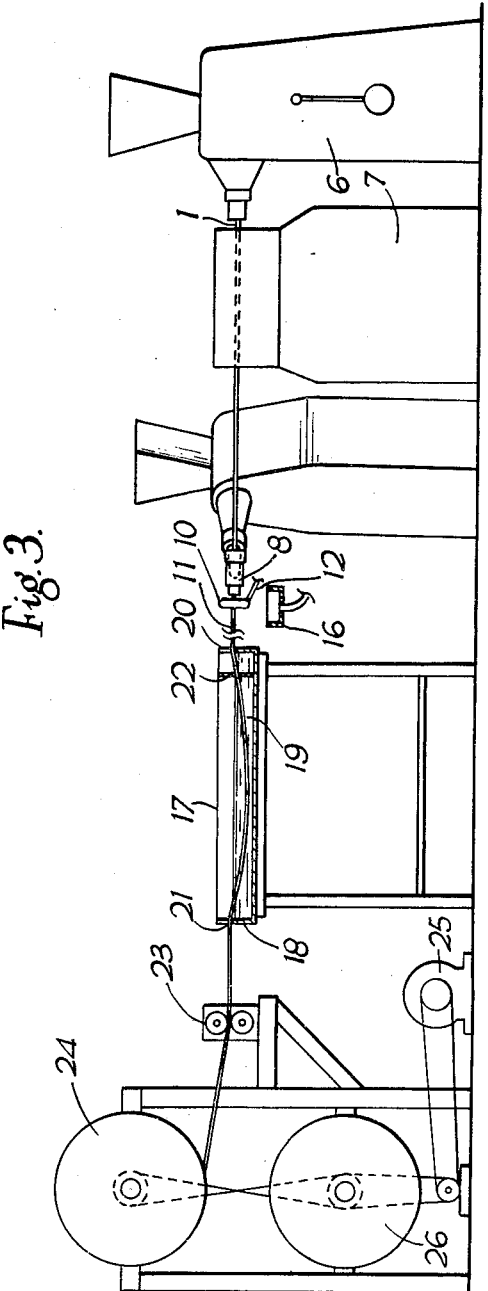
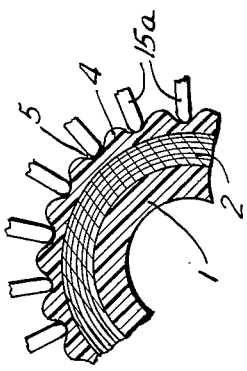

United States Patent Office 3,233,024
Patented Feb. 1, 1966

3,233,024
FLEXIBLE TUBES AND THE MANUFACTURE THEREOF
Harold Ernest Jackson, Plympton St. Maurice, and Trevor Frederick Moss, Newton Ferrers, England, assignors, by mesne assignments, to Imperial-Eastman Corporation, Chicago, Ill., a corporation of Illinois
Filed Aug. 31, 1960, Ser. No. 53,164
Claims priority, application Great Britain, Aug. 31, 1959, 29,691/59
6 Claims. (Cl. 264—173)

This invention relates to flexible or semi-flexible tubular conduits, pipes or tubes (hereinafter referred to generally as "tubes" or "tubing") and to the construction thereof. The invention is more particularly concerned with improvements in or modifications of the invention described in our United States patent application No. 770,466 filed Oct. 29, 1958.

Flexible tubing is required for many purposes. These include the conveyance under pressure of fluids (whether liquids or gases) and the provision of outer conduits for control cables, such as those of the Bowden wire type, in which movement is transmitted by a flexible wire or cable operating in the conduit. For such purposes we have devised a form of flexible tubing, as is more fully described in the specification of our aforesaid application, which comprises a seamless inner hollow core, which may be formed by extrusion from one of the polyamides which are known by the name "Nylon," an intermediate layer made of braided filaments, for which purpose it is preferred to use the polymeric linear terephthalic ester which is produced by condensing ethylene glycol with terephthalic acid and which is sold under the registered trademark "Terylene," and an outer sheath, which may be formed by extrusion, of a suitable synthetic plastic substance which will withstand the action of heat and light and other outside influences, while at the same time being resistant to mechanical damage. An example of such a material is the polyamide of 11-amino-undecanoic acid which is known as "Nylon 11" and which preferably has included in it one or more stabilising agents which will increase its resistance to the action of heat and light, including both high and low temperatures.

The present invention is primarily concerned with improvements in the method of construction of the outer sheath of the tubing, more particularly when it is made of nylon, notably "Nylon 11."

In certain applications and uses of composite flexible tubing, such as that described above, which is made of plastic materials, it is necessary to ensure that the tubing will have the ability to withstand repeated or continuous changes in torsional and bending loads applied to it, including changes in the directions of such loads, without becoming unduly subject to the condition known as fatigue, in which the material will tend to break under stresses which are considerably lower than its tensile strength. The fatigue mentioned is likely to occur, for example, when a flexible tube of the kind described is mounted in such a way that it takes on the form of a "U," each end being attached to a point which moves, relatively to another point, in a direction more or less at right-angles to the plane of the "U." Conditions of this sort are encountered, for example, in the case of flexible tubing or brake hose which is connected to the brakes of the front or steering road wheels of a motor vehicle, and which is intended either to carry a brake fluid or alternatively to provide an outer conduit for a cable for the operation of the brakes.

In the case of a flexible tube, such as that referred to above, which consists of a number of layers, the outer one being, for example, made of nylon, it will be apparent that the risk of fatigue will generally be greatest in the case of this outer layer and it is one of the objects of the present invention to provide a method of reducing this and of so constructing such a flexible tube that the outer layer or sheath will better withstand bending and the other stresses to which it is likely to be subjected in use than has generally been the case in the past.

A further object of the invention is to provide a method of forming such a flexible tube whereby the tube possesses a good degree of mechanical strength and resistance to abrasion.

According to the invention, in one of its aspects, a flexible tube is provided comprising a plurality of superimposed layers at least the outer one of which is in the form of a seamless sheath made of a material which is extrudable while hot and the physical properties of which are affected by its rate of cooling, wherein the outer sheath is formed with a series of longitudinally-extending ribs and grooves.

Experiments which have been carried out have shown that when certain materials, especially Nylon 11, are used for the outer sheath, the presence of the ribs and grooves on the latter has an important and most surprising effect on the properties of the material and that this can be used to provide a tube which will withstand frequent bending and flexing considerably better than would follow solely from the physical dimensions and form of the outer sheath with its ribs and grooves, as compared to a smooth sheath, if the physical properties of the material of the sheath were uniform throughout the latter. It is believed that this is due to the effects of the ribs and grooves on the rate of cooling of the material after extrusion and the invention, in another of its aspects, accordingly provides an improved method and an improved apparatus by means of which the cooling of the outer sheath of a tube which is formed with longitudinally extending ribs and grooves can be selectively controlled.

The invention accordingly further provides a method of forming a flexible tube comprising a number of superimposed layers the outer one of which is formed with a series of longitudinally extending ribs and grooves, which method comprises forming the outer layer over the previously-formed inner layer or layers of the tube by extruding over the latter the material of the outer layer, while hot, with the formation of the ribs and grooves, and thereafter passing the tube through a cooling device in which a cooling medium is brought into contact with selected portions of the surface of the tube as it passes through the device.

The cooling medium may be provided by a fluid, whether liquid or gaseous, jets of which are directed onto the tube, or alternatively cooling may be assisted by passing the tube through a cooling device in which solid elements, which are provided with suitable means for cooling them, are caused to engage the tube as the latter passes through the cooling device.

In yet another of its aspects the invention provides apparatus for forming a flexible tube which includes a number of superimposed layers the outer one of which is formed with a series of longitudinally extending ribs and grooves, wherein the apparatus comprises an extruder, through which the inner layer or layes of the tube can be fed and which is adapted to form the outer layer with its ribs and grooves by extrusion over the inner layer or layers, and a cooling device through which the tube leaving the extuder passes and in which selected portions of the surface of the tube are contacted by a cooling medium.

The invention will now be more fully described, by way of example, with reference to the accompanying drawings.

In the drawings:

FIGURE 3 is a general view showing in a somewhat diagrammatic form an assembly of apparatus for constructing the tubing according to the invention;

FIGURE 5 is a fragmentary cross-section of the tubing illustrating the cooling of the grooved portion thereof by solid cooling means.

The tests which have been made showing the effects of the ribs and grooves and of the selective cooling of the latter on the properties of the tube, particularly its resistance to repeated bending or flexing, have been directed principally to tubes in which the outer layer or sheath is made of nylon, particularly Nylon 11. This is a polyamide of 11-amino-undecanoic acid, and the invention will be more particularly described with reference to the use of this material for the outer layer or sheath.

Figure 1:
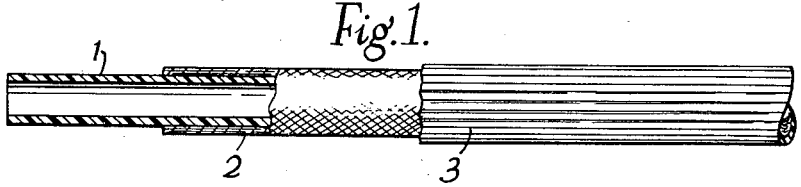
FIGURE 1 is a view, partly broken-away and in section, showing a sample of tubing constructed in accordance with the invention.
Figure 2:
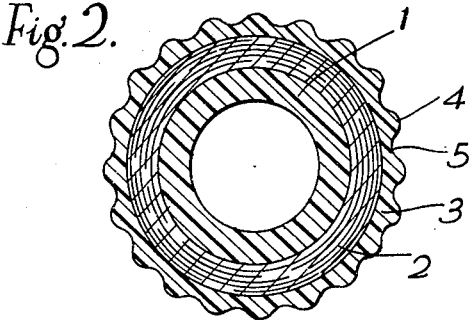
FIGURE 2 is a cross-section, taken to a larger scale, showing the tubing of FIGURE 1.

Referring first to FIGURES 1 and 2, the tubing shown, which may be intended for the conveyance of a fluid, such as the brake fluid of a motor vehicle, or which may be used to form the outer conduit of a cable of the Bowden wire type having a flexible inner cable or wire, comprises a seamless inner tube or core 1 which is formed by extrusion out of a suitable plastic material such as nylon. For this tube it is preferred to use Nylon 11, although other materials may be used, including other forms of nylon.

Nylon, particularly Nylon 11, if used for the core 1 will be impervious to most fluids and resistant to the action of many of them, but if it were exposed externally to light, heat and moisture and also to abrasion, it might be subject to deterioration and also to mechanical damage, such as scuffing or tearing. Furthermore, its strength might not be sufficient to withstand high internal pressures. In order to protect and strengthen the core 1, therefore, the latter is surrounded by an intermediate layer 2, which is formed of braided filaments. For these filaments it is preferred to use the material which is a polymeric linear terephthalic ester produced by condensing ethylene glycol with terephthalic acid and which is sold under the registered trademark "Terylene." This is a material which retains its strength either wet or dry and the fibres have qualities which are superior to those of most other fibres in their resistance to mineral or organic acids, to heat, to bacterial action and to rotting. The layer 2 therefore protects the inner core 1, particularly against tearing and against the effects of moisture, which might cause the nylon to swell. It enables the tube to withstand higher internal pressures.

The material of the layer 2 is not, however, entirely stable against light and heat, while it may be subject to mechanical damage as a result of scuffing or abrasion. In order to protect the layer 2, therefore, it is surrounded by an outer layer or sheath 3. This is made of Nylon 11, which is applied by extrusion in a manner which will be later described. It is formed with a series of longitudinally extending ribs 4 which are separated by grooves 5, the purposes of which have been referred to above.

The dimensions of the tube will, of course, be determined by its intended purpose, which will also affect the number and size of the ribs and grooves used. To give a particular example, however, it may be stated that tubing for use in supplying braking fluid to the brakes of motor vehicles may have an internal diameter, within the core 1, of about 0.13 inch (3.3 mm.) and an external diameter of about 0.3 inch (7.6 mm.). The outer sheath 3 may have a thickness of approximately 0.013 inch (0.33 mm.) to the bottoms of the grooves 5 and of 0.025 inch (0.64 mm.) to the tops of the ribs 4. The tops of the ribs 4 and the grooves 5 are smoothly rounded as is best shown in FIGURE 2.

Figure 4:
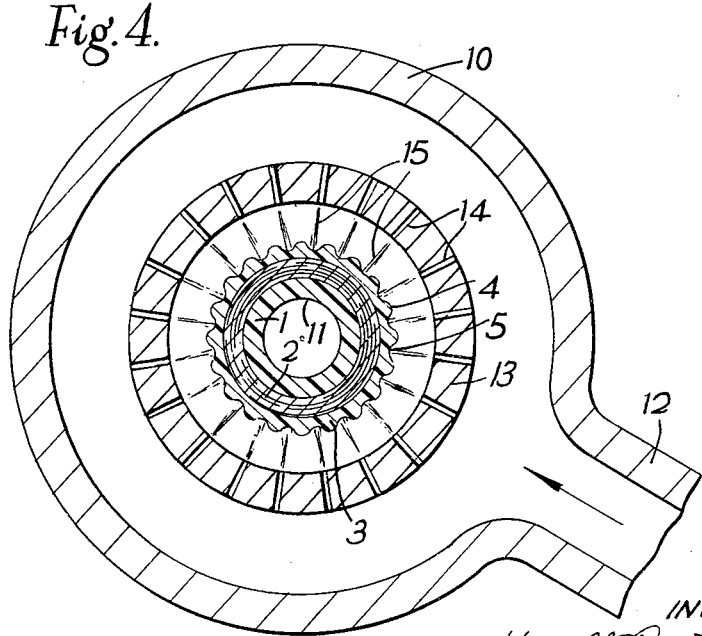
FIGURE 4 is a detail sectional view, to a larger scale, showing a part of the apparatus of FIGURE 3.

One method of forming the tube with its ribs and grooves will now be described in greater detail with reference to FIGURES 3 and 4.

Referring first to FIGURE 3, the inner core 1 is first formed by extrusion using an extruder of any suitable type which is indicated generally at 6. The core 1 then passes through a braiding machine 7 of any suitable type by which the intermediate layer 2 is applied to it. This layer is formed of braided "Terylene" filaments, as referred to above. The tube consisting of the inner core 1 and braided layer 2 then enters the extrusion head 8 of a second extruding machine 9, by means of which the outer sheath 3, of Nylon 11, with its ribs 4 and grooves 5 is formed.

Immediately the tube leaves the nozzle of the extruder head 8 it passes through a cooling device which is indicated generally at 10. Details of this cooler are best seen in FIGURE 4.

As shown, the cooler 10 comprises a hollow annular ring which surrounds the tube (here indicated generally at 11) and which has an inlet 12 by which it is connected to a supply of cooling fluid. Water is preferably used, although other liquids or gases (such as air) might also be employed. The water or other cooling fluid may be at room temperature or it may be cooled to below this temperature, if necessary.

The inner wall 13 of the cooler ring 10 is formed with a series of openings or nozzles 14 which are so dimensioned and arranged that they direct small jets 15 of the water or other cooling fluid into the bottoms of the grooves 5 between the ribs 4. As a result of this, when the tube 11 leaves the head 8, which it does with at least its outer layer 3 still hot, the material forming this layer is cooled more rapidly at the bottoms of the grooves 5 than it is within the ribs 4 and near the peaks of the latter. Experiments have shown that the resulting differential cooling between the thinner parts of the layer 3 at the bottoms of the grooves 5 and the thicker parts thereof which include the ribs 4 has a beneficial effect on the material (Nylon 11) in that it improves its resistance to fatigue, while maintaining good flexibility.

When water or other liquid is used as the cooling fluid a sump, indicated at 16, may be provided to collect it as it leaves the cooler 10.

After leaving the cooler 10 the tube 11 may be passed through a further cooling device 17 in order to complete its cooling. As shown in FIGURE 3 this device 17 may comprise a trough 18 which is partly filled with water, as indicated at 19. After entering the trough 18, which it does through slots 20 and 21 in the end walls of the latter, the tube 11 is guided down into the water 19 by being passed through a hole formed in a plate 22 fitted in the trough 18. Its own weight also assists in keeping the tube 11 beneath the water while it is passing through the trough. If desired rollers or other guides (not shown) may be provided below and/or above the tube 1 within the trough 18 in order to assist in supporting and/or guiding the tube.

The tube 11 is drawn from the cooling device 17 by means of a feed device 23, which may be of any suitable type. The speed of the feed device may be automatically controlled to correspond to the speed of extrusion by using automatic means, such as are well known in the art.

After leaving the feed device 23 the tube 11 is wound on a reel 24, which may be driven by any suitable drive from a motor 25. In the arrangement shown a second reel 26 is provided so that when the reel 24 is full the feed of the tube 11 can be transferred to the reel 26, while the reel 24 is removed and replaced by a fresh reel.

Instead of using water, air jets or other suitable means could be employed for the selective cooling of the outer layer of the tube. For example, as shown in FIGURE 5, direct contact with a solid cooling member or members 15a could be provided using, for example, a series of teeth or rotatable discs the points or edges of which engage in the grooves of the tube leaving the extruder. The teeth (or the part carrying them) or the discs could be cooled by any suitable means.

As has been stated above, the material which is used for the outer sheath 3, for example Nylon 11, preferably includes one or more stabilising agents in order to render it resistant to the action of light and heat, including not only radiated heat, such as from the sun, but also upper and lower extremes of temperature. An example of a material which contains such stabilising agents is that which is supplied under the trade name Ralsin P40T.

We claim:

1. A method of forming a flexible tube having a plurality of superimposed tubular layers, the outer one of which is formed with a series of longitudinally extending ribs and grooves, said method comprising the steps of: forming the outer layer over the outermost previously-formed inner layer of the tube by extruding over said inner layer hot material settable to define the outer layer having said ribs and grooves; and subsequently passing the tube through a cooling device in which a cooling medium is directed substantially only against the grooved portions of the surface of the tube as it passes through the device.

2. A method as claimed in claim 1, wherein the cooling medium is a fluid directed in the form of jets into the grooves.

3. A method as claimed in claim 1, wherein the cooling medium comprises solid means contacting the grooved surface of said outer layer, said solid means being concurrently cooled.

4. Apparatus for forming a flexible tube having a plurality of superimposed tubular layers, said apparatus comprising: an extruder; means for passing a tubular inner layer axially through the extruder, said extruder having means for extruding onto said inner layer an outer layer having outer, longitudinally extending ribs and grooves; and means for directing a cooling medium substantially only against the bottom portions of said grooves to cool the same.

5. Apparatus as claimed in claim 4 wherein the cooling means comprises means for directing separate jets of a cooling fluid onto the groove surface portion of the tube passing through it, the number of which jets is at least equal to the number of said grooves.

6. Apparatus as claimed in claim 4 wherein the cooling means comprises a hollow annular ring through which the tube coaxially passes as it leaves the extruder and which is formed internally with a plurality of jet openings.

References Cited by the Examiner
UNITED STATES PATENTS

| | | | |
|---|---|---|---|
| 2,461,594 | 2/1949 | Flounders | 138—137 |
| 2,501,690 | 3/1950 | Prendergast | 264—173 |
| 2,512,433 | 6/1950 | Leben | 138—126 |
| 2,525,272 | 10/1950 | Rhoton | 154—46 |
| 2,574,555 | 12/1951 | Galloway | 18—14 |
| 2,899,982 | 6/1957 | Harpfer | 138—137 |
| 3,015,133 | 1/1962 | Nichols | 264—173 |
| 3,049,762 | 8/1962 | Jackson | 264—173 |
| 3,106,748 | 10/1963 | Skobel | 264—173 |

ROBERT F. WHITE, *Primary Examiner.*

EDWARD V. BENHAM, ALEXANDER H. BRODMERKEL, *Examiners.*